O. REES.
WATER AND WIND ENGINE.
APPLICATION FILED DEC. 12, 1912.
1,096,057. Patented May 12, 1914.
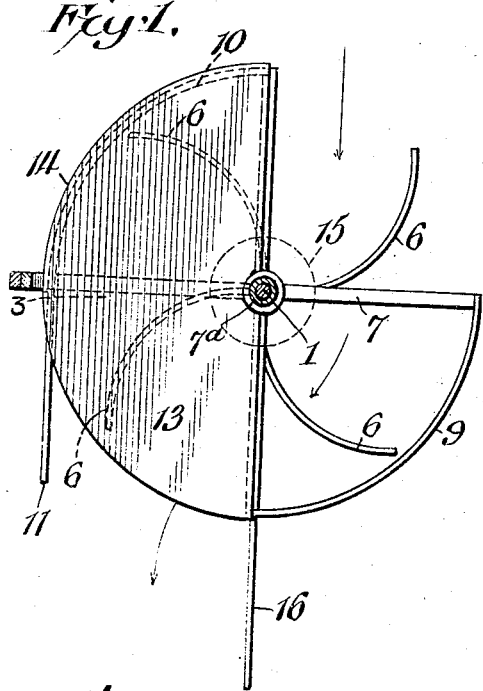
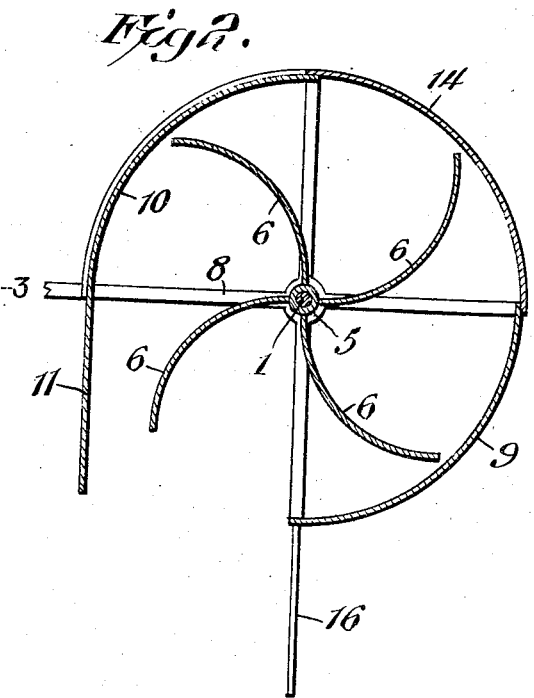
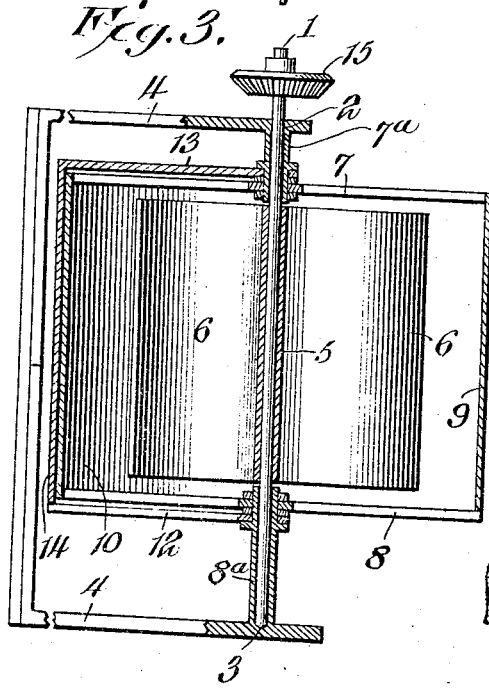
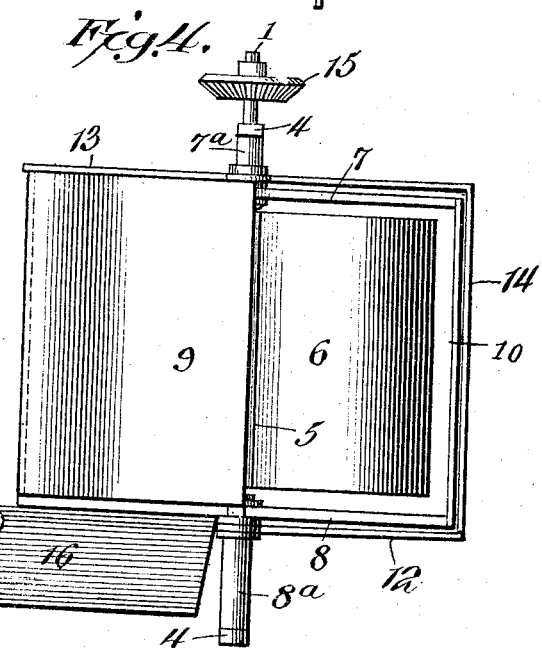
WITNESSES
Howard D. Orr.
F. J. Chapman.
Onesimus Rees, INVENTOR,
BY
C. G. Siggers
ATTORNEY

UNITED STATES PATENT OFFICE.

ONESIMUS REES, OF ROSWELL, NEW MEXICO.

WATER AND WIND ENGINE.

1,096,057.  Specification of Letters Patent.  Patented May 12, 1914.

Continuation of application Serial No. 704,209, filed June 17, 1912. This application filed December 12, 1912. Serial No. 736,434.

*To all whom it may concern:*

Be it known that I, ONESIMUS REES, a citizen of the United States, residing at Roswell, in the county of Chaves and State of New Mexico, have invented a new and useful Water and Wind Engine, of which the following is a specification.

This invention has reference to improvements in water and wind engines, and its object is to produce a structure responsive to currents of water or air, which structure shall be efficient in operation and at the same time be producible at low cost.

While the present invention is operable either as a wind engine or a water wheel, the description of the invention will be confined to its use as a water wheel for the purposes of simplicity of description, without, however, at all confining the use of the invention to such motive fluid.

In accordance with the present invention a vaned wheel is provided, the vanes preferably curving, although not necessarily so, and the axis of this rotor may be set either vertically or horizontally or at any suitable angle which may be desired, so that the vanes may be engaged by the flowing water in a manner to act upon the vanes upon one side of the axis of rotation, while to a marked extent inert to the vanes on the other side of the axis of rotation. To accomplish this shields are carried by the structure and so disposed as to lie on opposite sides of the axis of rotation, and these shields are preferably curved each on an arc struck from the axis of rotation. The shields are carried by supporting arms and are so disposed as to cover each approximately a quadrant, so that there are oppositely disposed quadrantal open spaces for the inflow and escape of water acting upon the blades or vanes of the rotor. The shields are under the control of a governor operating after the manner of the tail of a wind wheel to hold the structure in proper relation to the oncoming water and there is also provided an extension of one of the shields so disposed as to steady the structure in operation. Moreover, there is provided an adjustable cover member in overlying relation to the rotor, so that the structure may be readily started or stopped and interference from overlying water avoided.
The invention will be best understood from a consideration of the following detailed description, taken in connection with the accompanying drawings forming a part of this specification, with the further understanding that while the drawings show a practical embodiment of the invention, it is susceptible of other practical embodiments, wherefore the invention is not confined to any strict conformity with the showing of the drawings, but may be changed and modified so long as such changes and modifications mark no material departure from the salient features of the invention.

In the drawings:—Figure 1 is a plan view of the structure with the rotor shaft in cross section and showing the parts in operative position. Fig. 2 is a cross section showing the cover shield in position to prevent the stream of water from acting upon the water wheel or rotor. Fig. 3 is a section on the line 3—3 of Fig. 1. Fig. 4 is an elevation of the structure of Fig. 1 as viewed from the right hand side thereof.

Referring to the drawings, there is shown a shaft 1 mounted in bearings 2, 3, the latter of which may be a step bearing, and these bearings are carried by bars 4 or other structural devices suitable for the purpose, it being understood that the device of the present invention is designed to be immersed in a stream of water either wholly or partially, or, in the case of a wind wheel, to be mounted in a suitably elevated position where air currents may act upon it.

Fast to the shaft 1 there is a hub 5 from which extend vanes or blades 6 shown in the drawings as four in number and equidistantly disposed about the hub, but the invention is not confined to any particular number of blades. In the drawings the blades are shown as curving outwardly and away from the direction of rotation, but this arrangement is not obligatory. At opposite ends of the hub 5 there are spiders 7, 8, respectively, the spider 7 being in the particular structure illustrated shown as mounted to rotate on a sleeve 7ª on the end of one of the bars 4 while the arms of the spider 8 are shown as mounted to rotate on a sleeve 8ª carried by the other bar 4. The shaft 1 extends through both sleeves from the step bearing 3 to the bearing 2 and beyond the latter.

In the structure shown the arms of the spiders 7 and 8 radiate from the axis of the shaft in ninety degree relation, and connected to the outer ends of the arms are curved shields 9, 10 concentric with the axis of rotation of the shaft 1 and each including an arc of about ninety degrees struck from the axis of rotation. The radius of each shield 9 and 10 is such that the blades 6 may rotate between the shields in quite close relation thereto, but without actually touching them, and these shields being on opposite sides of the axis of rotation leave corresponding spaces on the unoccupied sides. One edge of the shield 10 is provided with a tangent prolongation 11 parallel with the arms of the spiders 7 and 8 carrying the adjacent edge of the shield 9, and the prolongation 11 is of such length that a tangent prolongation of the adjacent edge of the shield 9 would approach into close relation thereto in a direction substantially perpendicular to the prolongation 11.

Mounted rotatably on the sleeve 7ᵃ above the spider 7 and on the sleeve 8ᵃ below the spider 8 are arms 12 supporting a cover member 13 of approximately semi-circular contour in overlying relation to the rotor made up of the blades 6, and this cover member 13 is provided with a marginal shield 14 concentric with the shield 10 exterior thereto and having an extent circumferentially of about ninety degrees, or enough to span the open space between adjacent edges of the shields 9 and 10 remote from the space in part closed by the prolongation 11. While the shield 14 which may be termed a supplemental shield is of but about ninety degrees circumferential extent, the cover member 13 has a circumferential extent of about one hundred and eighty degrees.

The shaft 1 is designed to transmit power, wherefore it is provided with a pinion 15 or other suitable means for the purpose. In order to keep the structure in proper relation to a stream a blade or governor 16 is attached along the line of one of the arms of the spider 8 and may extend from near the sleeve 8ᵃ radially outward beyond the end of the spider arm for an appropriate distance. As shown, the blade or governor is below the spider 8 in the space between the same and the lower bar 4.

Let it be assumed that the structure is properly installed in a stream of water of suitable depth and force, the bars 4 providing a support without the necessity of building retaining walls or sluices or gates and special supporting structures being needed only in larger sizes of the device. The blade or governor 16 will respond to the flow of the stream to keep the device in proper relation thereto, so that the blade or governor stands nearly in line with the flow of the stream. Now, flowing water will pass through the structure by way of the side toward which the forward end of the shield 9 is presented and meeting the blades 6 will propel the same causing rotation of the shaft 1. The water is constrained by the inner surface of the shield 9 to move laterally of the device with respect to the general direction of the flow of water in the stream, until it finds escape past what may be termed the rear edge of the shield, this being the edge adjacent the blade or governor 16 and the water will flow out of the space between the rear edge of the shield 9. The extension 11 acts in the nature of a deflector or controller. Water striking the shield 9 tends to rotate the shield holding spiders which need not be made fast to any fixed object, but this tendency is resisted both by the governor and by the prolongation 11.

Under the running conditions which are represented in Fig. 1, the cover 13 is in overlying relation to the segment defined by the shield 10 and the space between the spider arms above the governor 16 and the prolongation 11, so that with the device immersed completely in the water the flowing stream above the device does not interfere with the proper movement of the rotor, which where surmounted by the cover 13 is moving contrary to the direction of flow of the stream. Suppose, now, it be desired to stop the rotor, it is then only necessary to move the cover member to bring the shield 14 into the path of the stream moving toward the active side of the rotor, so that the stream is cut off from access to the active side of the rotor and the latter will not turn. To start the rotor, it is simply necessary to return the cover member to the position shown in Fig. 1 and the flowing stream will at once act upon the rotor to set it in motion. The blade or governor 16 will maintain the structure always in proper relation to the running stream even though the direction of the current fluctuates, since the rotor or governor tends at all times to direct the receiving end of the device into proper relation to the direction of movement of the on coming water.

The power developed may be transmitted from the shaft by any suitable mechanism typified by the gear 15. It is not necessary that the device be installed on the bed of a stream or upon suitable supporting structures built in the bed of the stream, for it may readily be mounted upon a float or other like structure. Nor is it necessary that the shaft be placed vertically, but it may be placed horizontally and the rotor may be acted upon either as an over shot or an under shot wheel.

When the device is used as a wind engine, it requires no material change except that under such circumstances it is customary to take the power from the lower end of the shaft instead of the upper end, and the structure may be modified as to size and in other respects due to the different element in which it is employed. Where large power is desired, multiple arrangements may be employed, without any necessity of any change in the principles of the invention.

This application is a continuation of application No. 704,209, filed by me on June 17, 1912, for water and wind engine.

What is claimed is:—

1. In a fluid motor, a rotor having vanes responsive to the action of a flowing stream of fluid, a casing consisting solely of diametrically opposite connected curved shields each including an arc of substantially ninety degrees and separated at their adjacent edges by distances corresponding to chords of arcs of substantially ninety degrees and defining diametrically opposite inlet and outlet passages, and a governor blade carried by the casing wholly beneath the casing and out of the path of a stream of fluid passing through the casing.

2. In a fluid motor, a rotor having vanes responsive to the action of a flowing stream of fluid, a casing consisting solely of diametrically opposite connected curved shields each including an arc of substantially ninety degrees and separated at their adjacent edges by distances corresponding to chords of arcs of substantially ninety degrees and defining diametrically opposite inlet and outlet passages, and a governor blade carried by the casing wholly beneath the casing and out of the path of a stream of fluid passing through the casing, said motor being provided with a cover member including an arc of substantially one hundred and eighty degrees and mounted for rotation about the axis of the rotor independently of the casing, said cover member carrying a shield concentric with the casing and of a circumferential length to close the inlet to the casing when moved across the same.

3. In a fluid motor, a rotor having vanes responsive to the action of a flowing stream of fluid, a casing consisting solely of diametrically opposite connected curved shields concentric with the rotor and separated at their adjacent edges by spaces defining inlet and outlet openings for the casing, a governor blade carried by the casing wholly below said casing and arranged to hold the casing with one shield in advance of the other to present the convex side of the forward shield toward the on-coming stream and the concave side of the other in the path of the on-coming stream, and a member constituting a tangential prolongation of the rear edge of the front shield.

4. In a fluid motor, a rotor having vanes responsive to the action of a flowing stream of fluid, a casing consisting solely of diametrically opposite connected curved shields concentric with the rotor and separated at their adjacent edges by spaces defining inlet and outlet openings for the casing, a governor blade carried by the casing wholly below said casing and arranged to hold the casing with one shield in advance of the other to present the convex side of the forward shield toward the on-coming stream and the concave side of the other shield in the path of the on-coming stream, and a member constituting a tangential prolongation of the rear edge of the front shield, said motor being provided with a cover member of a size to overlie approximately one-half of the rotor and mounted for movement about the axis of the rotor independently of the casing, said cover member carrying a shield concentric with the casing and movable with the cover member into and out of covering relation to the intake side of the casing.

In testimony, that I claim the foregoing as my own, I have hereto affixed by signature in the presence of two witnesses.

ONESIMUS REES.

Witnesses:
ALBERT S. TRUBE,
IRA P. WETMORE.

Copies of this patent may be obtained for five cents each, by addressing the "Commissioner of Patents, Washington, D. C."